Oct. 21, 1941.   J. W. BEECHER   2,260,135
VENTING DEVICE FOR SEALS IN LIQUID-MEASURING SYSTEMS
Filed June 1, 1939
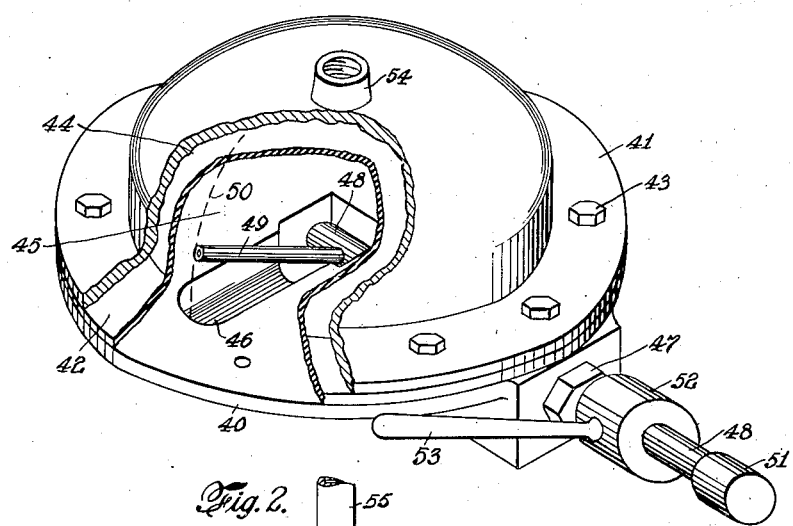
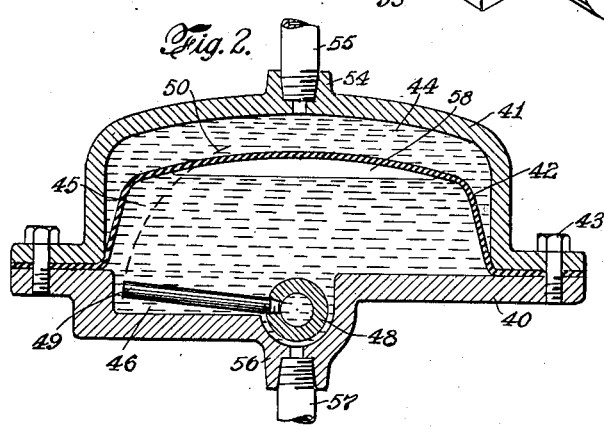
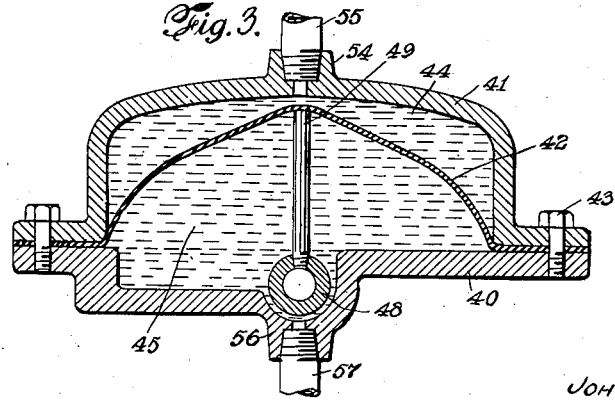
INVENTOR.
JOHN W. BEECHER
BY
ATTORNEY.

Patented Oct. 21, 1941

2,260,135

UNITED STATES PATENT OFFICE 2,260,135

VENTING DEVICE FOR SEALS IN LIQUID-MEASURING SYSTEMS

John W. Beecher, Waterbury, Conn., assignor to The Bristol Company, Waterbury, Conn., a corporation of Connecticut Application June 1, 1939, Serial No. 276,768

6 Claims. (Cl. 137—156)

This invention relates to seals for instruments for measuring differential liquid pressures, and more especially to means associated with such seals for facilitating the removal of air or other gases which tend to become entrapped therein, forming bubbles whose presence may introduce errors in the measurement to be effected.

The interposition of a movable impermeable sealing element between two bodies of liquid in a measuring system may be effected for various purposes. In one of these a resilient diaphragm is inserted in a conduit for the purpose of providing a seal between two bodies of liquid, without materially affecting their common fluid pressure, thus preventing admission of a corrosive or otherwise objectionable liquid to the interior parts of a measuring element, and permitting its pressure variations to be duplicated in a noninjurious liquid having free access to the instrument.

In this sealing device, if vertically disposed with its diaphragm member downwardly concave, (as is frequently essential for measuring purposes) there is a tendency for air or other gases, which may be released over periods of time from the liquid beneath the seal, to accumulate within the highest point of the same, eventually disturbing the normal fluid equilibrium of the system or forming a bubble of such volume as to exert an appreciable buoyant effort upon the surface with which it comes in contact, and introduce an error in the measurement to be carried out.

Because the highest part of the enclosed space in the device set forth is essentially associated with a movable element itself positioned in an outer enclosed space, it is obvious that the use of a permanent vent such as a petcock or an inverted siphon would be impracticable as interfering with freedom of movement of that element, or requiring that the apparatus be taken out of service and dismantled in order to remove entrapped gases.

It is proposed to meet the problem under consideration by the provision of a readily movable venting means which may, from the outside of the casing of such an instrument or seal, be manually manipulated to a position where the highest part of the interior of the moving element is temporarily placed in communication with the outside atmosphere. By this expedient, the free egress of entrapped gases under the influence of such fluid pressure as may exist within the casing will be effected.

The nature of the invention, however, will best be understood when described in connection with the accompanying drawing, in which:

Fig. 1 is a perspective view, partly in section, of a sealing device embodying the invention.

Figs. 2 and 3 are transverse vertical sections of the same, showing the novel venting device in its inoperative and operative positions, respectively.

The sealing device shown in the drawing is adapted for the physical separation of bodies of liquid to be maintained at a common pressure, usually for purposes of measurement. Thus, a base part 40 having a substantially flat upwardly-directed surface and a domed top part 41 having positioned therebetween a flexible impervious diaphragm 42 of rubber, neoprene, or the like, formed in the shape of an inverted saucer, are secured together, as by bolts 43, providing an enclosed chamber divided by said diaphragm into two compartments 44 and 45. A depression or channel 46 in the base part 40 forms a part of the lower compartment 45, and a portion of said channel is arranged to be placed in communication with exterior space through a stuffing box and gland or packing nut 47. Thus, a hollow circular shaft or tubular member 48 passes through the gland 47, and is free for rotation therein having one extremity exterior to the base part 40 and the other extremity within the compartment 45 and lying in the channel 46. Secured to the inner end of the hollow shaft 48, extending substantially perpendicularly thereto, and communicating with the interior thereof, is a tubular member 49 which is adapted to swing so that its extremity follows an arcuate path 50 as the shaft 48 is rotated about its own axis through an angle of substantially 90 degrees. When horizontally disposed, the member 49 lies wholly within the channel 46, thus leaving free the flat upper surface of the part 40 for substantially unobstructed engagement with the diaphragm 42, should the latter be forced to its lowest position, and thereby preventing straining, abnormal distortion, or tearing of the diaphragm. When the member 49 is vertically disposed, as shown in Fig. 3, its extremity will engage the concave lower surface of the diaphragm 42, lifting it above its normal operating range, and forming a slight pocket at the topmost point, at the same time leaving the side parts of the diaphragm sufficiently slack for limited deflection in response to changes in the pressure differential between the two bodies of liquid.

The inner end of the tubular shaft 48 is closed, and to the outer end is fitted a removable cap 51 which may be replaced by a petcock or valve, if desired. Secured to the tubular shaft 48 exteriorly of the base member 40 is a collar 52 carrying a lever or handle 53 whereby the said shaft may be rotated about its axis, the handle lying in a sense generally parallel to the tubular member 49, thus providing an indication of the rotated position of the latter.

A threaded outlet 54 at the topmost point of the domed part 41 provides connection for a pipe or conduit member 55; and a similar threaded outlet 56 at the lowest point of the channel 46 provides connection for a pipe or conduit member 57, the pipes 55 and 57 enabling the compartments 44 and 45 to be placed in communication with the system wherein are contained the liquids involved in the measurement, and these liquids completely filling the respective compartments.

Under normal operating conditions, the tubular member 49 lies horizontally in the channel 46, as shown in Fig. 2, providing no obstruction to the free movement of the diaphragm 42 in response to variations in relative pressures of the liquids in the compartments 44 and 45. In the event of the presence of a bubble 58 of entrapped gas beneath the diaphragm 42 being suspected or determined by test, the procedure is first to shut off communication between the piping system wherein exist the pressures under measurement, and the compartments 44 and 45, this being done by means of valves not shown in the drawing.

By means of the handle 53, the hollow shaft 48 is then rotated about its axis until the handle, and hence the tubular member 49, is in a substantially vertical position, as shown in Fig. 3, lifting the central portion of the diaphragm 42 to an apex higher than any position attained in normal operation and forming a small pocket at the topmost point, wherein will tend to collect any gas entrapped in the lower compartment. The cap 51 is then removed (or if a valve be used instead, this valve is opened), providing free communication between the lower side of the diaphragm 42 and the outside space. In the event of the static head of the liquids within the compartments being insufficient to force the entrapped gas out through the tubular members 49 and 48, liquid under pressure may be admitted through the pipe 57, whereupon the gas will be vented, which condition may be maintained until liquid makes its appearance at the outlet of the tubular shaft 48, thus signifying that the entrapped gas has been completely exhausted. While it might be thought that there would develop a tendency for the resilient material of the diaphragm to form a seal upon the flat end of the tube 49, experience with this device under actual operating conditions has shown that this does not occur, and that a flat end, making possible a certain wiping action without exerting any stretching force on the side walls of the diaphragm, is more effective in a complete removal of entrapped gases, than is a beveled end or a closed end with slots or openings on its lateral surfaces.

I claim:

1. In a liquid seal for measuring systems and including a casing affording an enclosed chamber and a flexibly yielding diaphragm dividing the chamber into vertically disposed compartments adapted to contain separate bodies of liquid: means for venting entrapped gases from the lower of said compartments and including a tubular member entering said compartment and communicating with space exterior to said casing, a hollow member carried by said tubular member within said lower compartment and projecting at an angle therefrom and communicating both with said lower compartment and the tubular member, means whereby said tubular member may be rotated about its axis through an angle carrying said hollow member from a substantially horizontal to a substantially vertical position within said lower compartment, said hollow member when in said vertical position engaging the lower face of said diaphragm and distorting the same whereby the topmost part of the space in said lower compartment may be placed in communication with the interior of said hollow and tubular members, together with means exterior to said casing for controlling the communication of said last-named member with space external the casing.

2. In a device of the class described; a casing affording an enclosed chamber having therein a vertically movable flexibly yielding separator member separating said chamber into two vertically disposed compartments adapted to be individually filled with separate bodies of liquid: means for venting gases entrapped within the lower of said compartments and comprising an angularly conformed vent pipe having an opening within the lower of said compartments and being rotatable from a position out of the range of movement of said member to positions where said opening engages the highest part of the lower face of said separator member at any point in its range of movement to distort the same, together with means providing controlled communication between said opening and space external to said casing.

3. In a liquid seal for measuring systems and including a casing affording an enclosed chamber and a flexibly yielding diaphragm dividing the chamber into vertically disposed compartments adapted to contain separate bodies of liquid: means for venting entrapped gases from the lower of said compartments and including a tubular member entering said compartment and communicating with space exterior to said casing, a hollow member carried by said tubular member within said lower compartment and projecting at an angle therefrom and communicating both with said lower compartment and the tubular member, means whereby said tubular member may be rotated about its axis through an angle carrying said hollow member from a substantially horizontal to a substantially vertical position within said lower compartment, said hollow member when in said vertical position engaging the lower face of said diaphragm and distorting the same whereby the topmost part of the space in said lower compartment may be placed in communication with the interior of said hollow and tubular members, together with removable cap means for controlling the communication of said last-named member with space external the casing.

4. In a device of the class described; a casing affording an enclosed chamber having therein a vertically movable flexibly yielding separator member dividing said chamber into two vertically disposed compartments adapted to be individually filled with separate bodies of liquid, means for venting gases entrapped within the lower of said compartments and comprising an angularly conformed vent pipe having an opening within the lower of said compartments and being rotatable about a horizontal axis from a position out of the range of movement of said member to a position where said opening engages the lower face of said separator, distorting the same to form a pocket at the highest point of said lower face, wherein may accumulate said gases and enter said opening, together with means providing controlled communication between said opening and space external to said casing.

5. In a liquid seal for measuring systems; a casing affording an enclosed chamber having a flexibly yielding diaphragm dividing said chamber into two vertically disposed compartments adapted to be individually filled with separate bodies of liquid, means for venting entrapped gases from the lower of said compartments and including a tubular member entering said lower compartment and communicating with space external to said casing, a stuffing box permitting said tubular member to be rotated about its own axis and providing a seal between said compartment and space exterior to the same, a hollow member carried by said tubular member within the lower of said compartments, projecting from said tubular member at an angle, and communicating with both said lower compartment and the tubular member, means whereby said tubular member may be rotated in said stuffing box through an angle, of substantially 90° to the movement of said hollow member from a substantially horizontal position to a substantially vertical position within said lower compartment to engage the lower face of and to distort said diaphragm.

6. In a liquid seal for measuring systems; a casing affording an enclosed chamber having a substantially flat interior bottom surface with a channel therein, and a flexibly yielding diaphragm dividing said chamber into two vertically disposed compartments adapted to be individually filled with separate bodies of liquid, means for venting entrapped gases from the lower of said compartments and including a tubular member entering the channeled bottom part of said compartment and communicating with space exterior to said casing, a hollow member carried by said tubular member within the lower of said compartments, projecting from said tubular member at an angle, and communicating with both said lower compartment and tubular member, means whereby said tubular member may be rotated about its axis through an angle carrying said hollow member from a substantially horizontal position wholly within said channeled bottom part to a substantially vertical position within said lower compartment, said hollow member when in said vertical position engaging the lower face of said diaphragm to distort the same whereby the topmost part of the space in said lower compartment may be placed in communication with the interior of said hollow and tubular members.

JOHN W. BEECHER.